(12) United States Patent
Ogushi

(10) Patent No.: US 8,315,523 B2
(45) Date of Patent: Nov. 20, 2012

(54) COMMUNICATION SYSTEM, TERMINATING APPARATUS, AND PON VIRTUALIZATION METHOD FOR USE THEREIN

(75) Inventor: Sadaichiro Ogushi, Tokyo (JP)

(73) Assignee: NEC Corporation, Tokyo (JP)

( * ) Notice: Subject to any disclaimer, the term of this patent is extended or adjusted under 35 U.S.C. 154(b) by 1150 days.

(21) Appl. No.: 12/047,027

(22) Filed: Mar. 12, 2008

(65) Prior Publication Data

US 2008/0226293 A1    Sep. 18, 2008

(30) Foreign Application Priority Data

Mar. 14, 2007   (JP) ................. 2007-064275

(51) Int. Cl.
*H04J 14/00*   (2006.01)
(52) U.S. Cl. ........... 398/72; 398/67; 398/68; 398/69; 398/71; 398/98; 398/100; 398/58; 398/59; 370/392; 370/352; 370/489; 370/468; 370/466
(58) Field of Classification Search .............. 398/58, 398/59, 66, 67, 68, 69, 70, 71, 72, 98, 99, 398/100, 168, 43, 154, 155, 45, 46, 51, 54; 370/392, 395.53, 400, 389, 535, 351, 468, 370/466, 352, 395.31
See application file for complete search history.

(56) References Cited

U.S. PATENT DOCUMENTS

| | | | | |
|---|---|---|---|---|
| 6,967,949 B2 * | 11/2005 | Davis et al. | | 370/390 |
| 7,664,019 B2 * | 2/2010 | Boyd et al. | | 370/230 |
| 2004/0120326 A1 * | 6/2004 | Yoon et al. | | 370/395.53 |
| 2005/0083950 A1 * | 4/2005 | Choi et al. | | 370/395.53 |
| 2007/0264017 A1 * | 11/2007 | Mizutani et al. | | 398/72 |

FOREIGN PATENT DOCUMENTS

| | | |
|---|---|---|
| CN | 1823546 A | 8/2006 |
| JP | 2006109500 A | 4/2006 |
| JP | 2006352350 A | 12/2006 |
| JP | 2007005097 A | 1/2007 |
| JP | 2007506300 A | 3/2007 |
| KR | 2004-56585 A | 7/2004 |
| KR | 2005-38069 A | 4/2005 |
| WO | 2005034568 A | 4/2005 |
| WO | 2007026749 A | 3/2007 |

OTHER PUBLICATIONS

Korean Office Action for KR 10-2008-0023956 issued Aug. 11, 2009.
Chinese Office Action for CN200810083649.9 issued Oct. 26, 2011.
Japanese Office Action for JP2007-064275 issued Jan. 17, 2012.

* cited by examiner

*Primary Examiner* — Hanh Phan

(57) ABSTRACT

When a frame is received from one of PON ports 12*a* to 12*c* of ONUs 1*a* to 1*c*, an OLT 3 compares VPIDs contained in Preamble/SFD regions A of the received Ethernet® frame with VPIDs assigned to LAN ports 31 and 32 of the OLT 3. Upon coincidence, a PON MAC process is started. When a frame is received from a PON port 33 of the OLT 3, each of the ONUs 1*a* to 1*c* compares a VPID contained in a Preamble/SFD region of the received Ethernet® frame with VPIDs assigned to the ONUs 1*a* to 1*c*. Upon coincidence, a PON MAC process is started.

12 Claims, 11 Drawing Sheets

| Unit | VPID |
|---|---|
| ONU1a | 0x5555 |

FIG. 3A

| Unit | VPID |
|---|---|
| ONU1b | 0x5555 |

FIG. 3B

| Unit | VPID |
|---|---|
| ONU1c | 0x5554 |

FIG. 3C

| Port | VPID |
|---|---|
| OLT Port | 0x5555 |
| OLT Port | 0x5554 |

FIG. 3D

| Unit | VPID |
|---|---|
| ONU Port1 | 0x5555 |
| ONU Port2 | 0x5554 |

| VPID | LLID | MAC |
|---|---|---|
| 0x5555 | 100 | MAC Address of ONU 1 |
| | 101 | MAC Address of ONU 1 |
| | 102 | MAC Address of ONU 2 |
| 0x5554 | 98 | MAC Address of ONU 1 |
| | 99 | MAC Address of ONU 2 |

| Equipment | VPID |
|---|---|
| OLT VLAN#100 | 0x5555 |
| OLT VLAN#200 | 0x5554 |

COMMUNICATION SYSTEM, TERMINATING APPARATUS, AND PON VIRTUALIZATION METHOD FOR USE THEREIN

This application is based upon and claims the benefit of priority from Japanese patent application No. 2007-64275, filed on Mar. 14, 2007, the disclosure of which is incorporated herein in its entirety by reference.

BACKGROUND OF THE INVENTION

This invention relates to a communication system, a terminating apparatus which is one of a station's terminal equipment and a subscriber's terminal unit of the communication system, and a PON (Passive Optical Network) virtualization method and, in particular, to virtualization in a PON.

FIG. 1 shows a typical network in an EPON (Ethernet® Passive Optical Network). The network includes ONUs (Optical Network Units: subscriber's terminal units) 4a to 4c which have Ethernet® ports 41a to 41c and PON ports 42a to 42c, respectively. The EPON (or GEPON (Gigabit Ethernet® Passive Optical Network)) is disclosed in Japanese Unexamined Patent Application Publications (JP-A) Nos. 2006-352350 and 2006-109500.

An OLT (Optical Line Terminal: station's terminal equipment) 6 has a plurality of Ethernet® ports 61 and 62 and a PON port 63. The PON ports 63 and 42a to 42c of the OLT 6 and the ONUs 4a to 4c are connected in a star topology via an optical coupler 5 by the use of optical fibers.

Generally, an EPON apparatus is produced in the form of a layer 2 switch or router having an Ethernet® port. Practically, the PON port, which physically is one port, is logically divided by LLIDs (Logical Link Identifiers) defined by IEEE (Institute of Electrical and Electronic Engineers) 802.3 (clause 65).

The LLIDs are in one-to-one correspondence to MAC (Media Access Control) addresses of the ONUs. Therefore, as the number of logical ports is increased, a corresponding number of MAC addresses are consumed. For example, for one ONU which supports 8 LLIDs, 8 MAC addresses are consumed. Therefore, depletion of the MAC addresses is a problem of deep concern.

In the above-mentioned related communication system, the LLIDs are used to construct a PON according to IEEE 802.3. The LLIDs are in one-to-one correspondence to the MAC addresses of the ONUs. Therefore, if the number of LLIDs for each ONU is increased, a large number of the MAC addresses are consumed.

SUMMARY OF THE INVENTION

It is therefore an exemplary object of this invention to provide a communication system, a terminating apparatus which is one of a station's terminal equipment and a subscriber's terminal unit of the communication system, and a PON virtualization method used therefor, which are capable of achieving a simple network architecture by the use of a PON domain and logically expanding a PON without consuming a large number of MAC addresses.

According to an exemplary aspect of this invention, there is provided a communication system comprising a single physical PON (Passive Optical Network), the physical PON comprising a subscriber's terminal unit having a LAN (Local Area Network) port and a PON port, a station's terminal equipment having a plurality of LAN ports and a PON port, and an optical fiber which connects between the PON ports of the subscriber's terminal unit and the station's terminal equipment, wherein:

the physical PON is used as a plurality of virtual PONs which are obtained by virtually dividing the physical PON.

According to another exemplary aspect of this invention, there is provided a terminating apparatus for use in a communication system comprising a single physical PON (Passive Optical Network), the physical PON comprising a subscriber's terminal unit having a LAN (Local Area Network) port and a PON port, a station's terminal equipment having a plurality of LAN ports and a PON port, and an optical fiber which connects between the PON ports of the subscriber's terminal unit and the station's terminal equipment, the physical PON being used as a plurality of virtual PONs which are obtained by virtually dividing the physical PON, wherein:

the terminating apparatus which is one of the station's terminal equipment and the subscriber's terminal unit has a VPID table which holds a correspondence between VPIDs (Virtual PON Identifiers) for identifying the virtual PONs and the LAN ports or the subscriber's terminal unit;

a group of the port and the unit having the identical VPID being recognized as a single PON domain;

the VPID for identifying the PON domain being embedded in a Preamble/SFD (Start Frame Delimiter) region of a LAN frame, the VPIDs being used in logically dividing the physical PON to obtain the virtual PONs.

According to still another exemplary aspect of this invention, there is provided an EPON virtualization method for use in a communication system comprising a single physical PON (Passive Optical Network), the physical PON comprising a subscriber's terminal unit having a LAN (Local Area Network) port and a PON port, a station's terminal equipment having a plurality of LAN ports and a PON port, and an optical fiber which connects between the PON ports of the subscriber's terminal unit and the station's terminal equipment, wherein:

the physical PON is used as a plurality of virtual PONs which are obtained by virtually dividing the physical PON.

With the structure and the operation mentioned above, it is an exemplary effect of this invention that a network architecture of the communication system is simplified by the PON domain and the PON can be logically expanded without consuming a large number of MAC addresses.

BRIEF DESCRIPTION OF THE DRAWING

FIGS. 3A to 3D show VPID tables of ONUs and an OLT illustrated in FIG. 2;

DESCRIPTION OF THE EXEMPLARY EMBODIMENTS

The communication system according to the exemplary aspect of this invention is characterized in that, in a typical network architecture in an EPON (Ethernet® Passive Optical Network), the network architecture is simplified by a PON (Passive Optical Network) domain and the PON is logically expanded without consuming a large number of MAC (Media Access Control) addresses.

In the communication system, an identifier for identifying the PON domain is embedded in, for example, fourth and fifth bytes in a Preamble/SFD (Start Frame Delimiter) region of an Ethernet® frame. A network is logically constructed by the identifier. Except the above, LLIDs (Logical Link Identifiers) according to IEEE (Institute of Electrical and Electronic Engineers) 802.3 are used as they are.

The communication system includes an ONU (Optical Network Unit: subscriber's terminal unit) having an Ethernet® port and a PON port, and an OLT (Optical Line Terminal: station's terminal equipment) having a plurality of Ethernet® ports and a PON port. The PON ports of the OLT and the ONU are connected in a star topology via an optical coupler by the use of optical fibers.

Each of the OLT and the ONU has a VPID table which stores a correspondence between a VPID (Virtual PON Identifier) for identifying a virtual PON and the Ethernet® ports or the ONU (the subscriber's terminal unit). In this case, a group of the port and the ONU (the subscriber's terminal unit) having the identical VPID is recognized as a single PON domain.

In the communication system, one physical PON is virtually divided. That is, the physical PON is used as a plurality of virtual PONs which are obtained by virtually dividing the physical PON. In this manner, it is possible to achieve not only a flexible network design but also a network design on a service-by-service basis without consuming a large number of MAC addresses.

As described above, in the communication system, the concept of a PON domain is introduced and each PON domain is identified by a VPID. In this manner, a network architecture is simplified by the PON domain and a PON can be logically expanded without consuming a large number of MAC addresses.

Now, several exemplary embodiments of this invention will be described with reference to the drawings.

First Exemplary Embodiment

Figure 1:
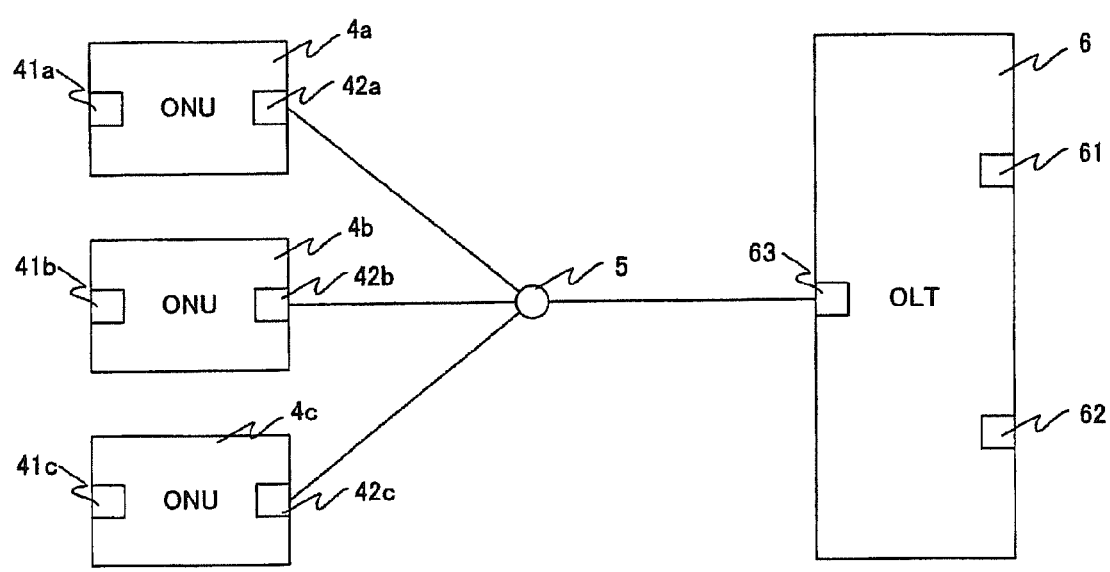
FIG. 1 is a block diagram showing a network architecture of a related communication system.
Figure 2:
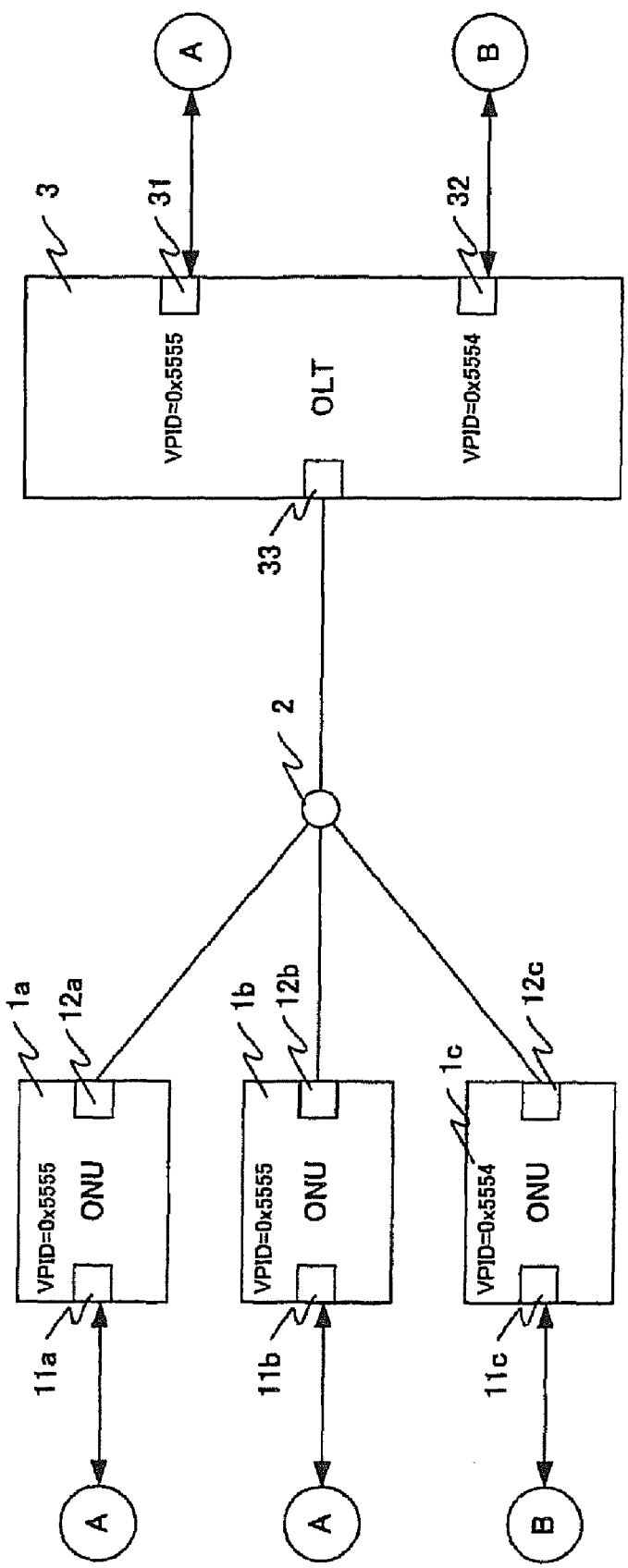
FIG. 2 is a block diagram showing a network architecture of a communication system according to a first exemplary embodiment of this invention.

Referring to FIG. 2, a communication system according to a first exemplary embodiment of this invention includes a single physical PON (Passive Optical Network). The physical PON includes a plurality of ONUs (Optical Network Units: subscriber's terminal units) 1a to 1c, an optical coupler 2, and an OLT (Optical Line Terminal) 3. The ONUs 1a to 1c have LAN (Local Area Network) ports (for example, Ethernet® ports) 11a to 11c and PON (Passive Optical Network) ports 12a to 12c, respectively. The OLT 3 has a plurality of LAN ports 31 and 32 and a PON port 33. The PON ports 12a to 12c and 33 are connected in a star topology via the optical coupler 2 by the use of optical fibers. The physical PON is used as a plurality of virtual PONs which are obtained by virtually dividing the physical PON.

Referring to FIGS. 3A to 3D, the ONUs 1a to 1c and the OLT 3 in FIG. 2 have VPID (Virtual PON identifier) tables, respectively. Each of the VPID tables illustrated in FIGS. 3A to 3D stores a correspondence between VPIDs for identifying the virtual PONs and the LAN ports or the subscriber's terminal units (the ONUs). Herein, a group of the ports and the units for which the identical VPID is stored in the VPID tables are recognized as a single PON domain. That is, a group of the ports and the units having the identical VPID are recognized as a single PON domain.

Specifically, referring to FIG. 2, the LAN ports 11a, 11b, and 31 belong to a PON domain (domain A) identified by the VPID "0x5555". On the other hand, the LAN ports 11c and 32 belong to a PON domain (domain B) identified by the VPID "0x5554". Thus, the physical PON is used as a plurality of virtual PONs which are obtained by virtually dividing the physical PON. In this event, the VPIDs are used in logically dividing the physical PON to obtain the virtual PONs.

FIG. 3A shows the VPID table of the ONU 1a. FIG. 3B shows the VPID table of the ONU 1b. FIG. 3C shows the VPID table of the ONU 1c. FIG. 3D shows the VPID table of the OLT 3.

Figure 4:
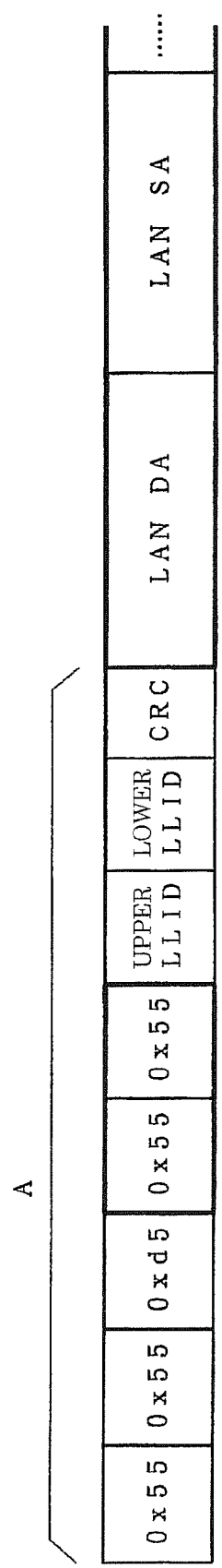
FIG. 4 is a view showing a Preamble/SFD region of an Ethernet® frame according to the first exemplary embodiment of this invention.

FIG. 4 shows a Preamble/SFD (Start Frame Delimiter) region in an Ethernet® frame according to the first exemplary embodiment of this invention.

In this exemplary embodiment, in order to identify the virtual PONs by the VPIDs, the OLT 3 must be able to identify the VPIDs to which frames received from the ONUs 1a to 1c belong. This also applies to the ONUs 1a to 1c.

The VPID is identified in the following manner. In the Ethernet® frame transmitted and received in a PON section, fourth and fifth bytes (portions surrounded by thick frames) of the Preamble/SFD region A defined by the IEEE (Institute of Electrical and Electronic Engineers) 802.3 (clause 65) are replaced by the VPID, as shown in FIG. 4.

According to the IEEE standard, this region is fixed to two bytes "0x5555". In this case, the VPID is "0x5555". The OLT 3 and the ONUs 1a to 1c can be assigned with VPIDs, respectively.

According to setting, the OLT 3 and the ONUs 1a to 1c transmit and receive the frames in which the Preamble/SFD region A (FIG. 4) is replaced. For this purpose, when the OLT 3 and the ONUs 1a to 1c transmit or receive the frames through ports 33 and 12a to 12c, the following process is carried out.

Figure 5:
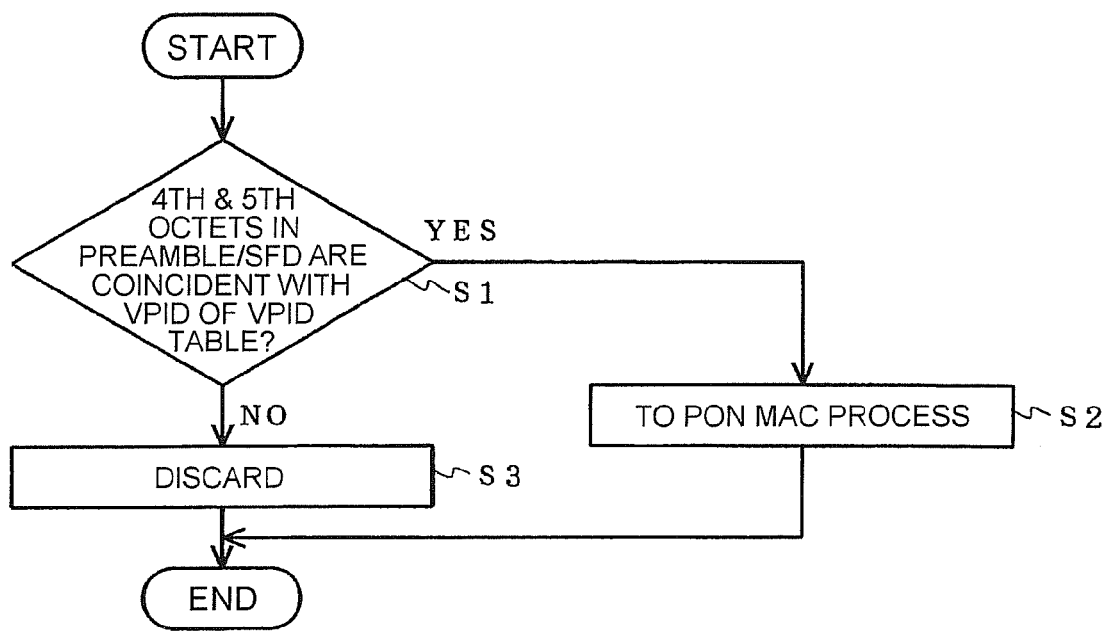
FIG. 5 is a flow chart showing an operation of the OLT illustrated in FIG. 2.
Figure 6:
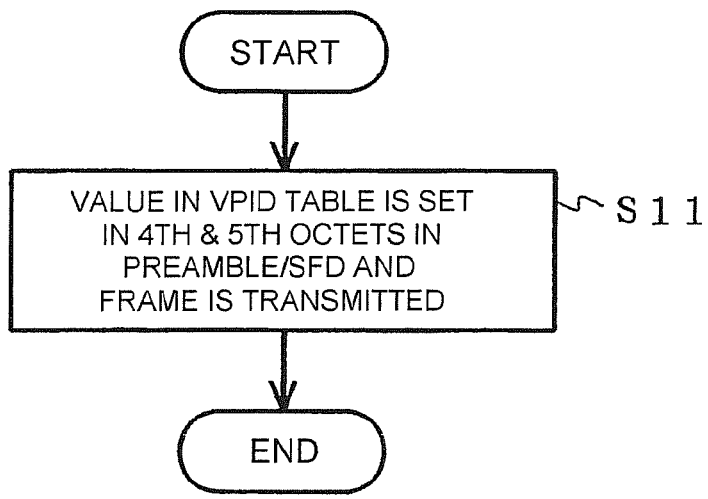
FIG. 6 is a flow chart showing an operation of the ONU illustrated in FIG. 2.
Figure 7:
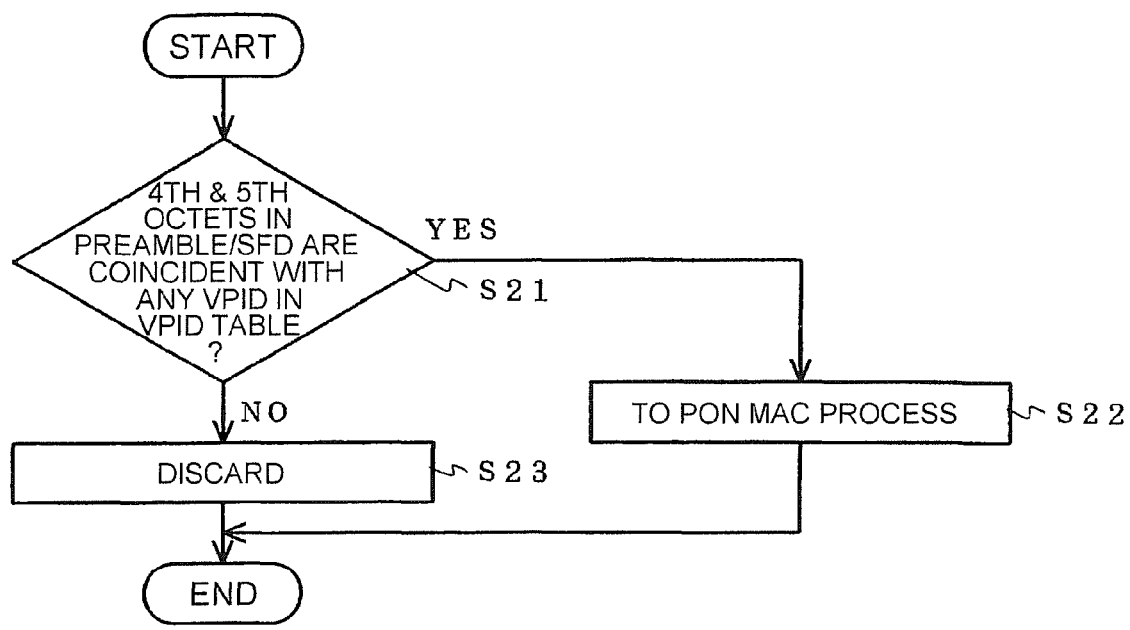
FIG. 7 is a flow chart showing an operation of the ONU illustrated in FIG. 2.
Figures 8, 9:
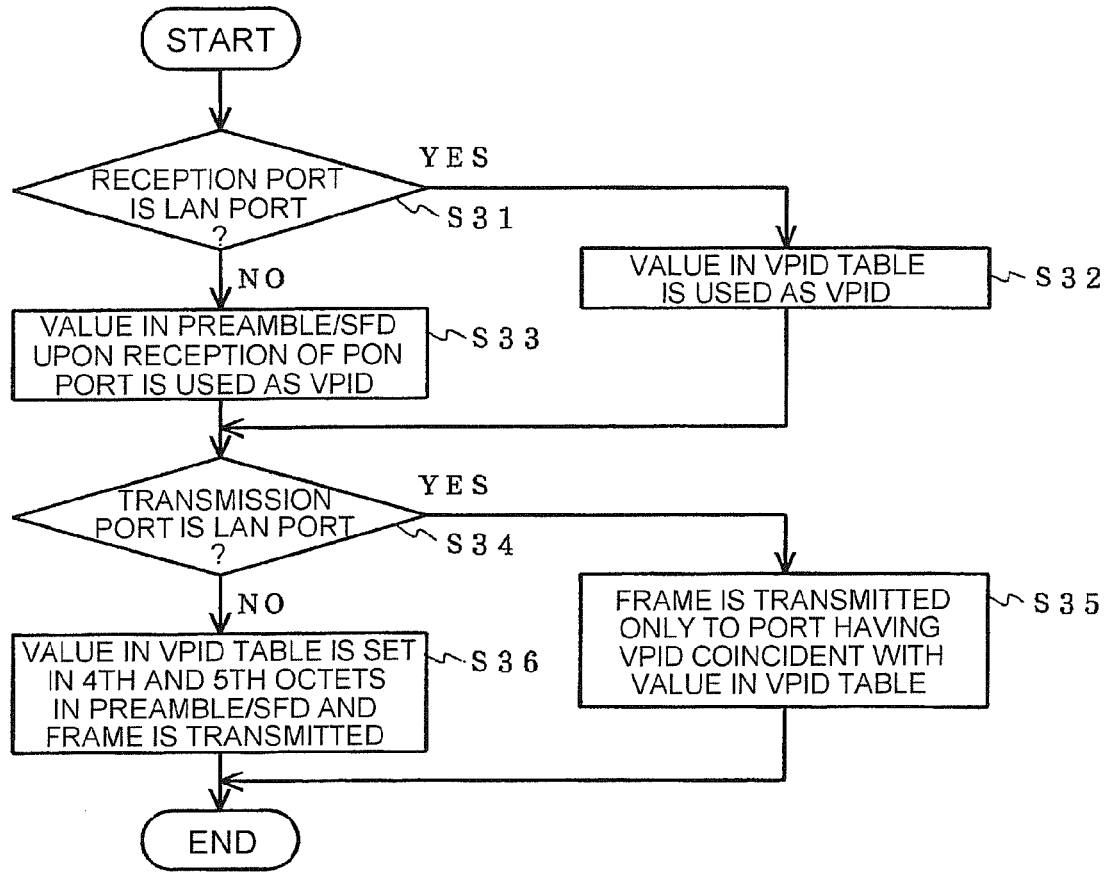
FIG. 8 is a flow chart showing an operation of the OLT illustrated in FIG. 2.
FIG. 9 is a view showing a VPID table of an ONU according to a second exemplary embodiment of this invention.

FIG. 5 is a flow chart showing the operation of the OLT 3 in FIG. 2. FIGS. 6 and 7 are flow charts showing the operation of the ONUs 1a to 1c in FIG. 2. FIG. 8 is anther flow chart showing the operation of the OLT 3 in FIG. 2. Referring to FIGS. 2 to 8, the operation of the communication system according to the first exemplary embodiment of this invention will be described.

It is assumed that the OLT 3 receives the frames from the PON ports 12a to 12C of the ONUs 1a to 1c. In this case, the OLT 3 compares the VPIDs contained in the Preamble/SFD regions A of the received Ethernet® frames with the VPIDs which are assigned to the LAN ports 31 and 32 of the OLT 3 and stored in the VPID table (FIG. 3D) of the OLT 3 (step S1 in FIG. 5). Upon incoincidence, the Ethernet® frames are discarded (step S3 in FIG. 5).

Upon coincidence between these VPIDs, the OLT 3 does not discard the Ethernet® frames and starts a PON MAC process according to the IEEE 802.3, such as checking of LLIDs (Logical Link Identifiers) (step S2 in FIG. 5).

It is assumed that the ONUs 1a to 1c transmit the frames through the PON ports 12a to 12c. In this case, in a stage of constructing the Preamble/SFD region A (FIG. 4) after the PON MAC process according to IEEE 802.3, the ONUs 1a to 1c set, instead of "0x5555", the VPIDs assigned thereto (step S11 in FIG. 6).

It is assumed that the ONUs 1a to 1c receive the frame from the PON port 33 of the OLT 3. In this case, the ONUs 1a to 1c compare the VPID contained in the Preamble/SFD region A (FIG. 4) of the received Ethernet® frame with the VPIDs which are assigned to the ONUs 1a to 1c and stored in the VPID tables (FIGS. 3A, 3B, and 3C) of the ONUs 1a to 1c (step S21 in FIG. 7). Upon incoincidence between the VPIDs, the Ethernet® frame is discarded (step S23 in FIG. 7).

Upon coincidence between the VPIDs, the ONUs 1a to 1c do not discard the Ethernet® frame and start the PON MAC process according to IEEE 802.3 (step S22 in FIG. 7). When the frame is transferred to the LAN ports 11a to 11c, the frame is transferred only to the port assigned with the identical VPID.

It is assumed that the OLT 3 receives the frame from one of the LAN ports 31 and 32 and transmits the frame through the PON port 33 (no in step S34 in FIG. 8). In this case, in a stage of constructing the Preamble/SFD region A (FIG. 4) after the PON MAC process according to IEEE 802.3, the OLT 3 sets, in fourth and fifth octets, the VPID assigned to the above-mentioned one of the LAN ports 31 and 32 (step S36 in FIG. 8).

That is, when the frame is received from the LAN port 31 or 32 (yes in step S31 in FIG. 8), the VPID assigned to the LAN port 31 or 32 of the OLT 3 is used (step S32 in FIG. 8). When the frame is received from the PON port 33 (no in step S31 in FIG. 8), the VPID embedded in the frame received via the PON port 33 is used (step S33 in FIG. 8).

In case where the frame is transmitted via the LAN port 31 or 32 (yes in step S34 in FIG. 8), the OLT 3 transmits the frame only to the port having the VPID coincident with the value in the VPID table (step S35 in FIG. 8).

Thus, in this exemplary embodiment, it is possible to improve flexibility in network design. For example, a plurality of virtual EPON (Ethernet® Passive Optical Network) systems can be separated on a service-by-service basis such as a telephone service and an Internet service or on an ISP (Internet Service Provider)-by-ISP basis.

In the EPON of the related art, a logical network is designed by the use of LLIDs and the LLIDs are used to identify logical links in the PON. Therefore, in order to realize a function as a network, another concept including LLIDs is required. Typically, a table storing VLANs (Virtual Local Area Networks) and MAC addresses in correspondence to LLIDs is provided.

In the EPON virtualization method according to this exemplary embodiment, it is possible to have typical EPON systems using the above-mentioned LLIDs, equal in number to the VPIDs. Therefore, the VPIDs are separated on a service-by-service basis and the related typical EPON systems are operable on the service-by-service basis.

Thus, according to this exemplary embodiment, the network architecture is simplified by the PON domain and the PON can be logically expanded without consuming a large number of MAC addresses.

Second Exemplary Embodiment

FIG. 9 shows a VPID table of an ONU according to a second exemplary embodiment of this invention. Referring to FIG. 9, in the second exemplary embodiment of this invention, in case where the ONU has a plurality of ports, the ports are related to the VPIDs to provide a plurality of PON domains. Therefore, the VPID table holds VPID values on a port-by-port basis.

The above-mentioned second exemplary embodiment is similar in structure and operation to the first exemplary embodiment except that the ONU has a plurality of ports and the VPID table holds the VPID values on a port-by-port basis.

Thus, the ONU according to the second exemplary embodiment of this invention performs frame processing in the manner similar to the OLT. Even if the ONU has a single LAN port, the VPID may be selected by any sorting method, for example, by looking the inside of the frame (TCP (Transmission Control Protocol) port number or the like). In this case, the second exemplary embodiment is also applicable.

Figures 10, 11:
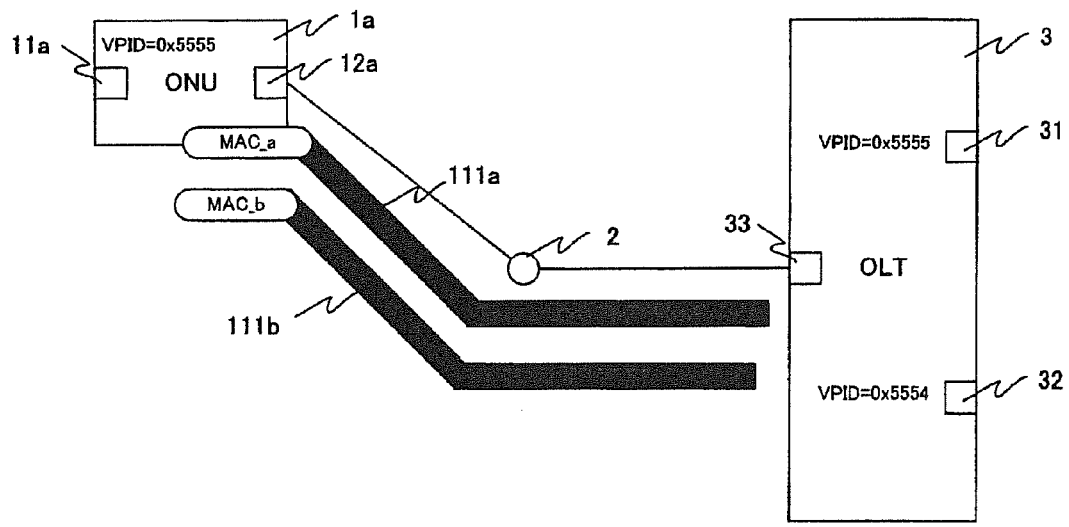
FIG. 10 is a view showing an administration table of an OLT according to the second exemplary embodiment of this invention.
FIG. 11 is a view for describing an effect of the second exemplary embodiment of this invention.

FIG. 10 shows an administration table of the OLT according to the second exemplary embodiment of this invention. In FIG. 10, in the second exemplary embodiment of this invention, the OLT administrates the LLIDs in the ONUs on a VPID-by-VPID basis. Specifically, the OLT has the administration table illustrated in FIG. 10 in order to administrate the LLIDs per each PON domain. In the administration table illustrated in FIG. 10, in a PON domain "0x5555", two LLIDs for an ONU1 and one LLID for an ONU2 are established. In a PON domain "0x5554", one LLID for the ONU1 and one LLID for the ONU2 are established.

Thus, in this exemplary embodiment, MAC addresses are saved. In IEEE 802.3 (clause 64), the LLIDs and the MAC addresses of the ONUs are in one-to-one correspondence. This means that, upon establishing a plurality of LLIDs for the ONU, the MAC addresses, equal in number to the LLIDs, are consumed.

Figures 12, 13:
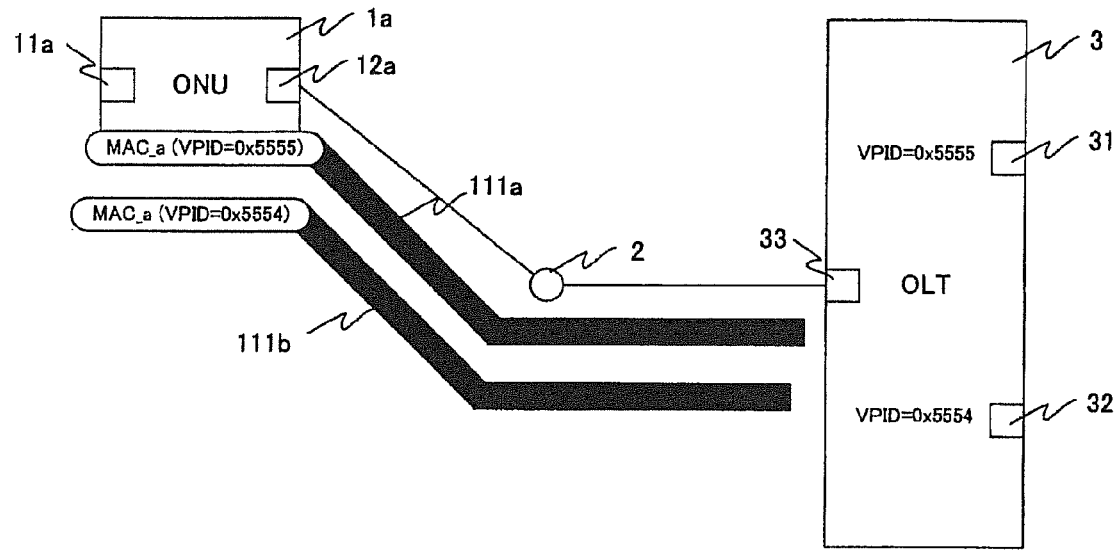
FIG. 12 is a view for describing an effect of the second exemplary embodiment of this invention.
FIG. 13 is a view showing a VPID table of an OLT according to a third exemplary embodiment of this invention.

FIGS. 11 and 12 are views for describing the effect of the second exemplary embodiment of this invention. In FIG. 11, the ONU1a is connected to the OLT 3 by the two LLIDs. The LLID 111a is identified by MAC_a. The LLID 111b is identified by MAC_b. In the technique of the related art, an additional MAC address is assigned every time when the LLID is increased in number.

On the other hand, in this exemplary embodiment, when the ONU 1a establishes a plurality of LLIDs 111a and 111b, one LLID is established individually for each PON domain as illustrated in FIG. 12. Therefore, the network can logically be expanded with only one MAC address kept consumed.

Third Exemplary Embodiment

FIG. 13 shows a VPID table of an OLT according to a third exemplary embodiment of this invention. Referring to FIG. 13, in the third exemplary embodiment of this invention, VPID is related to IEEE 802.1D VLAN. The VPID table of the OLT holds VPID values on a VLAN-by-VLAN basis. Likewise, the VPID table of each of the ONUs holds VPID values on a VLAN-by-VLAN basis. The third exemplary embodiment of this invention is different from the first and the second exemplary embodiments in this respect.

A subsequent process after establishing the VPID value by the VLAN is similar to that in the first and the second exemplary embodiments. A variety of VLAN systems, such as by reception ports, by presence or absence of tags, by protocol numbers, or by IP (Internet Protocol) subnets, are known. Herein, the VLAN system is not specifically limited.

Figure 14:
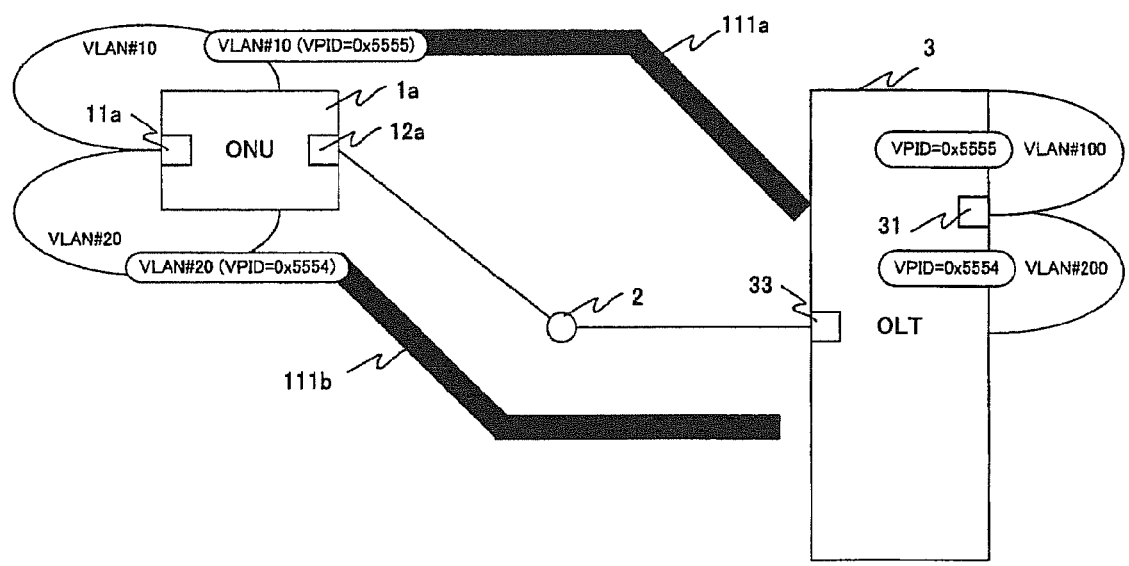
FIG. 14 is a view showing a communication system according to the third exemplary embodiment of this invention.

FIG. 14 shows a communication system according to the third exemplary embodiment of this invention. Referring to FIG. 14, the LAN port 31 of the OLT 3 belongs to VLAN #100 and VLAN #200. The VLAN #100 belongs to a PON domain of the VPID "0x5555". The VLAN #200 belongs to a PON domain of the VPID "0x5554".

The LAN port 11a of the ONU 1a belongs to VLAN #10 and VLAN #20. The VLAN #10 belongs to a PON domain of the VPID "0x5555". The VLAN #20 belongs to a PON domain of the VPID "0x5554". As a result, the VLAN #100 of the OLT 3 and the VLAN #10 of the ONU 1a belong to the same PON domain. On the other hand, the VLAN #200 of the OLT 3 and the VLAN #20 of the ONU 1a belong to the same PON domain.

As described above, in this exemplary embodiment, the EPON network can be simplified in architecture by correspondence between the VPID and the VLAN. Generally, the VLAN is a function of a layer 2 switch. The layer 2 switch is an apparatus frequently used upon constructing a network. Therefore, in this exemplary embodiment, it is easy to construct the EPON network.

Fourth Exemplary Embodiment

Figure 15:
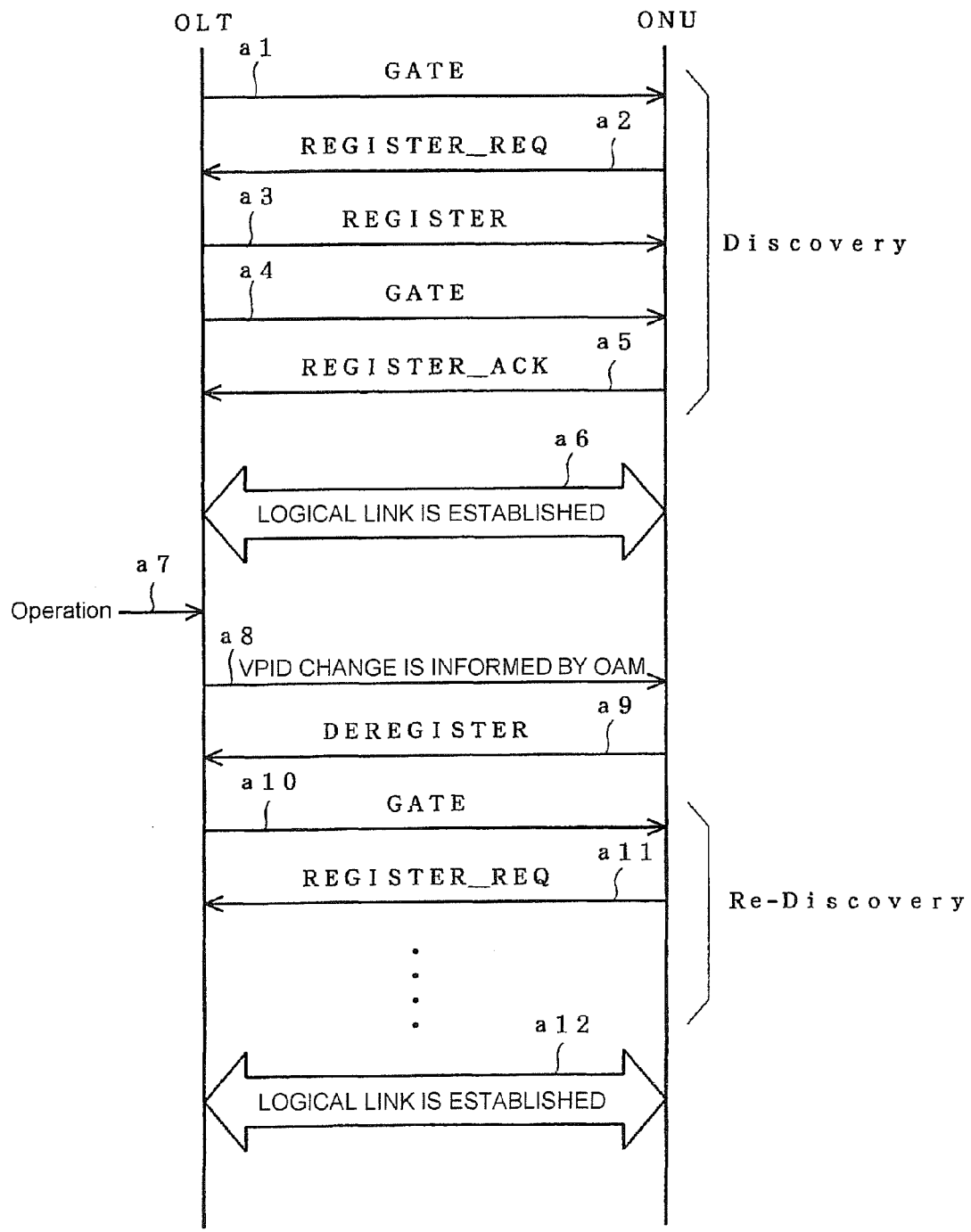
FIG. 15 is a sequence chart showing an operation of a communication system according to a fourth exemplary embodiment of this invention.

FIG. 15 is a sequence chart showing an operation of a communication system according to a fourth exemplary embodiment of this invention. Referring to FIG. 15, an operation of the communication system according to the fourth exemplary embodiment will be described. In this exemplary embodiment, the PON domain is dynamically changed.

According to IEEE 802.3 (clause 64), when the ONU is connected, a discovery stage (operation a1 to a5 in FIG. 15) is carried out first and, as a consequence, a logical link is established (a6 in FIG. 15).

After establishment of the logical link, any triggering action, such as an operator's operation (a7 in FIG. 15), is carried out. In response to the triggering action and by the use of an OAM (Operation, Administration, and Maintenance) defined by IEEE 802.3 (clause 57), the ONU is informed of VPID change (a8 in FIG. 15). The discovery stage is carried out again (a9, a10, a11 in FIG. 15) to re-establish the logical link (a12 in FIG. 15). Thus, in this exemplary embodiment, the PON domain can dynamically be changed.

As described above, according to this exemplary embodiment, services are dynamically switched. For example, a low-priority service (PON domain 1) and a high-priority service (PON domain 2) are provided and, by switching the PON domains, service differentiation can be achieved. Such switching can be carried out only by an operation of the OLT without requiring a new equipment. Thus, it is possible to simplify service differentiation on a user-by-user basis.

In each of the foregoing exemplary embodiments, the EPON has been described. However, this invention is also applicable to a variety of PONs other than the EPON.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication system comprising a single physical PON (Passive Optical Network), said physical PON comprising a subscriber's terminal unit having a LAN (Local Area Network) port and a PON port, a station's terminal equipment having a plurality of LAN ports and a PON port, and an optical fiber which connects between the PON ports of the subscriber's terminal unit and the station's terminal equipment, wherein:

said physical PON is used as a plurality of virtual PONs which are obtained by virtually dividing said physical PON;

each of the station's terminal equipment and the subscriber's terminal unit has a VPID table which holds a correspondence between VPIDs (Virtual PON Identifiers) for identifying the virtual PONs and the LAN ports or the subscriber's terminal unit;

a group of the port and the unit having the identical VPID being recognized as a single PON domain; and the VPID for identifying the PON domain being embedded in a Preamble/SFD (Start Frame Delimiter) region of a LAN frame, the VPIDs being used in logically dividing said physical PON to obtain the virtual PONs.

2. The communication system according to claim 1, wherein the VPID table of the subscriber's terminal unit holds the VPIDs on a port-by-port basis of the subscriber's terminal unit.

3. The communication system according to claim 1, wherein the VPID table of each of the subscriber's terminal unit and the station's terminal equipment holds the VPIDs on a VLAN (Virtual Local Area Network)-by-VLAN basis.

4. The communication system according to claim 1, wherein the PON domain is dynamically changed.

5. A terminating apparatus for use in a communication system comprising a single physical PON (Passive Optical Network), said physical PON comprising a subscriber's terminal unit having a LAN (Local Area Network) port and a PON port, a station's terminal equipment having a plurality of LAN ports and a PON port, and an optical fiber which connects between the PON ports of the subscriber's terminal unit and the station's terminal equipment, said physical PON being used as a plurality of virtual PONs which are obtained by virtually dividing said physical PON, wherein:

said terminating apparatus which is one of the station's terminal equipment and the subscriber's terminal unit has a VPID table which holds a correspondence between VPIDs (Virtual PON Identifiers) for identifying the virtual PONs and the LAN ports or the subscriber's terminal unit;

a group of the port and the unit having the identical VPID being recognized as a single PON domain;

the VPID for identifying the PON domain being embedded in a Preamble/SFD (Start Frame Delimiter) region of a LAN frame, the VPIDs being used in logically dividing said physical PON to obtain the virtual PONs.

6. The terminating apparatus according to claim 5, wherein the VPID table of the terminating apparatus which is the subscriber's terminal unit holds the VPIDs on a port-by-port basis of the subscriber's terminal unit.

7. The terminating apparatus according to claim 5, wherein the VPID table of the terminating apparatus which is the subscriber's terminal unit or the station's terminal equipment holds the VPIDs on a VLAN (Virtual Local Area Network)-by-VLAN basis.

8. The terminating apparatus according to claim 5, wherein the PON domain is dynamically changed.

9. An EPON virtualization method for use in a communication system comprising a single physical PON (Passive Optical Network), said physical PON comprising a subscriber's terminal unit having a LAN (Local Area Network) port and a PON port, a station's terminal equipment having a plurality of LAN ports and a PON port, and an optical fiber which connects between the PON ports of the subscriber's terminal unit and the station's terminal equipment, wherein:

said physical PON is used as a plurality of virtual PONs which are obtained by virtually dividing said physical PON;

each of the station's terminal equipment and the subscriber's terminal unit has a VPID table which holds a correspondence between VPIDs (Virtual PON Identifiers) for identifying the virtual PONs and the LAN ports or the subscriber's terminal unit;

a group of the port and the unit having the identical VPID being recognized as a single PON domain; and the VPID for identifying the PON domain being embedded in a Preamble/SFD (Start Frame Delimiter) region of a LAN frame, the VPIDs being used in logically dividing said physical PON to obtain the virtual PONs.

10. The EPON virtualization method according to claim 9, wherein the VPID table of the subscriber's terminal unit holds the VPIDs on a port-by-port basis of the subscriber's terminal unit.

11. The EPON virtualization method according to claim 9, wherein the VPID table of each of the subscriber's terminal unit and the station's terminal equipment holds the VPIDs on a VLAN (Virtual Local Area Network)-by-VLAN basis.

12. The EPON virtualization method according to claim 9, wherein the PON domain is dynamically changed.

* * * * *